UNITED STATES PATENT OFFICE.

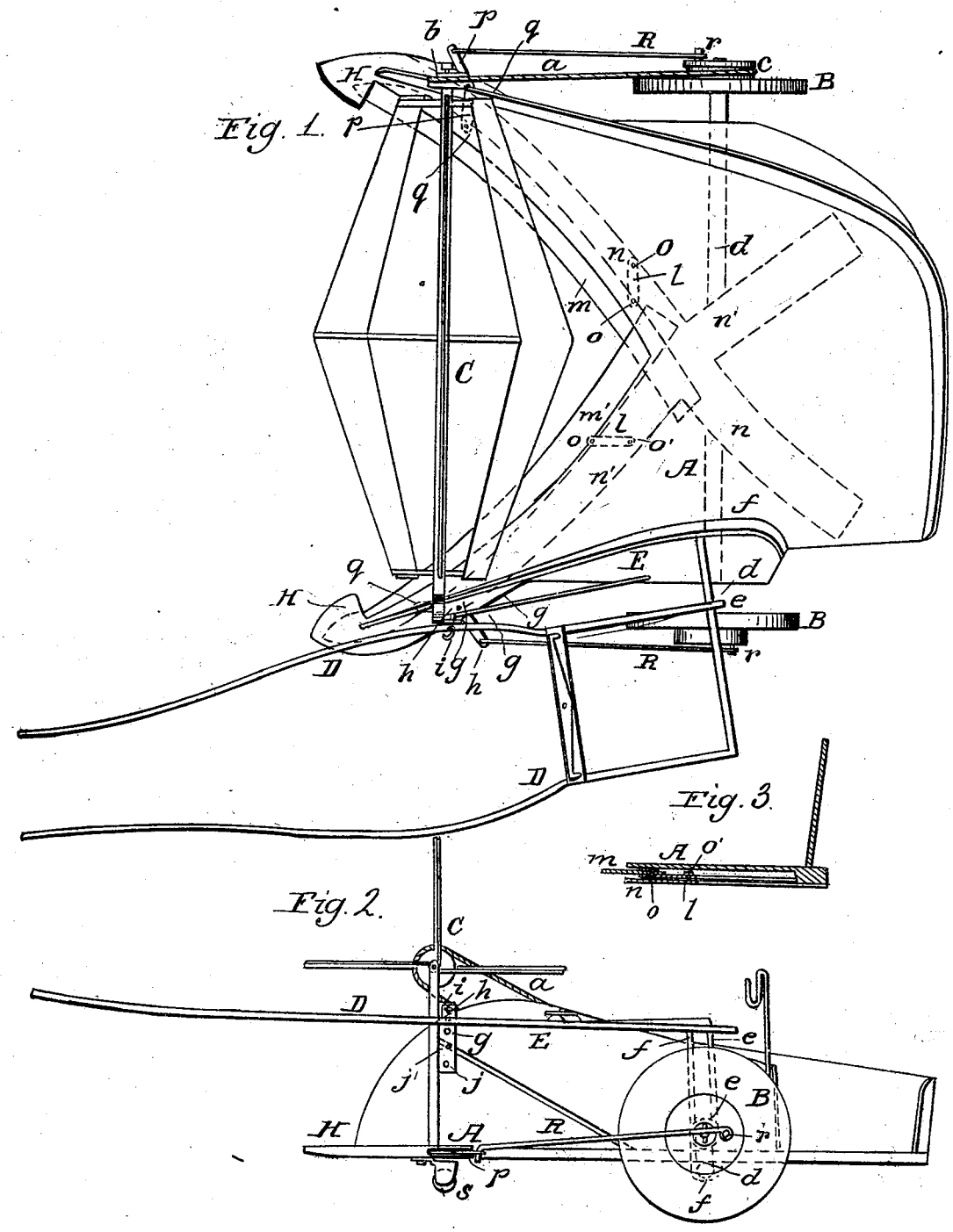

SAMUEL GUMAER, OF CHICAGO, ILLINOIS.

IMPROVEMENT IN HARVESTERS.

Specification forming part of Letters Patent No. 17,927, dated August 4, 1857.

*To all whom it may concern:*

Be it known that I, SAMUEL GUMAER, of Chicago, in the county of Cook and State of Illinois, have invented a new and useful Improvement in Harvesters; and I do hereby declare that the following is a full, clear, and exact description of the construction and operation of the same, reference being had to the annexed drawings, forming part of this specification, in which—

Figure 1 is a top view of the machine. Fig. 2 is a side elevation.

Similar letters of reference denote the same part.

The nature of my invention consists in a peculiar cutting apparatus combined with a peculiar form of reel, operating as hereinafter described, for facilitating the cutting of grain.

The platform A is supported upon two wheels, B B', and has a re-entrant front, as shown in Fig. 1. Supported by standards, and extending across the front of the machine, is a reel, C, having the central swell shown in the drawings, to correspond with the re-entrant front of the platform. This reel is driven by a band, $a$, passing over pulleys $b$ and $c$, the latter secured to the wheel B'.

The thills D are attached to the axle $d$ by two depending bars, $e$ and $f$, eyes of which embrace the axle. On the forward portion of the side piece, E, is a perforated plate, $g$, in contact with an eye, $h$, on the thills. A pin, $i$, passed through this eye and one of the holes $j$, regulates the elevation of the front of the machine. The axle $d$ is so situated that the center of gravity of the machine falls in front of it, causing therefore a large proportion of the weight to be supported by the back of the animal when the machine is in operation.

The cutting apparatus consists of two blades, $m\ m'$, swung upon plates $n\ n'$ under the re-entrant front of platform A. Each blade is connected with its plate by a rod, $l$, connecting the studs $o$ and $o'$, and by a lever, $p$, attached to the blade at $q$ and to the plate at $q'$. The relative position of blades, plate, and connecting-rod is shown in the detached view, which represents a vertical section through these parts. The projecting arm of the lever $p$ is connected by a rod, R, with a stud, $r$, upon the main wheel, so that by the rotation of the wheel a vibration of the lever is produced, causing the connections of the blade with lever $p$ and rod $l$ to describe arcs of circles about their attachments to the lower plates. This gives the blade a motion longitudinally, and at the same time causes it to move from rear to front, and the reverse, producing a drawing cut similar to the action of a scythe in harvesting.

At the front extremities of the platform are cases H, to protect the outer ends of the blades; and under these are small rollers $s$, to to prevent the points from running into the ground when passing over uneven surfaces.

The blades $m\ m'$ are beveled from the under side to form the edge, which tends to make the machine run lighter than where the bevel is from the top, as, instead of being drawn downward by the cut, the tendency will be upward.

In operation the proper elevation is given the cutting-edge, as above described, and the machine driven forward. The reel carries the grain to the blades, which, moving as above set forth, perform the cutting operation, and the grain falls upon the platform. It is removed by a rake in the hands of a man walking by the side of the machine; or any automatic device may be employed for freeing the platform.

It will be seen that the center swell of the reel has a peculiar action when used in connection with the peculiar cutting apparatus before described, which action consists in carrying the grain toward the extremities of the reel, and thus presenting it to the cutting apparatus so as to receive the drawing cut produced by the curvilinear reciprocation of the blades $m\ m'$, while at the same time the reel-shaft is in a line perpendicular to the line of motion of the machine.

What I claim as new and of my own invention, and desire to secure by Letters Patent, is—

The combination of the blades $m\ m'$ with the peculiarly-constructed platform A and the center swell-reel, C, when said parts are arranged to operate in relation to each other as and for the purpose set forth.

In testimony whereof I have hereunto signed my name before two subscribing witnesses.

SAML. GUMAER.

Witnesses:
GEO. PATTEN,
JOHN S. HOLLINGSHEAD.